(12) United States Patent
Ambrosi (10) Patent No.: US 7,543,855 B2
(45) Date of Patent: Jun. 9, 2009

(54) HOSE COUPLING WITH A LOCKING MECHANISM

(75) Inventor: Johann Ambrosi, Herbrechtingen (DE)

(73) Assignee: Max Widenmann KG Armaturenfabrik, Giengen/Brenz (DE)

( * ) Notice: Subject to any disclaimer, the term of this patent is extended or adjusted under 35 U.S.C. 154(b) by 283 days.

(21) Appl. No.: 11/446,823

(22) Filed: Jun. 5, 2006

(65) Prior Publication Data

US 2006/0273587 A1 Dec. 7, 2006

(30) Foreign Application Priority Data

Jun. 6, 2005 (DE) .................. 20 2005 008 795 U (51) Int. Cl.
*F16L 35/00* (2006.01)
(52) U.S. Cl. .................... 285/91; 285/85; 285/402; 285/376
(58) Field of Classification Search ............ 285/91, 285/85, 404, 402, 376
See application file for complete search history.

(56) References Cited

U.S. PATENT DOCUMENTS

| 266,359 | A | * | 10/1882 | Gotzel | 285/85 |
|---|---|---|---|---|---|
| 450,373 | A | * | 4/1891 | Ott | 285/85 |
| 643,358 | A | * | 2/1900 | Konold | 285/85 |
| 767,843 | A | * | 8/1904 | Smith | 285/85 |
| 789,541 | A | * | 5/1905 | Hayes | 285/85 |
| 815,627 | A | * | 3/1906 | Oldham | 285/84 |
| 836,457 | A | * | 11/1906 | Pellar | 285/85 |
| 1,112,850 | A | * | 10/1914 | Sherer | 285/79 |
| 1,857,420 | A | * | 5/1932 | Wolford | 285/85 |
| 2,684,860 | A | * | 7/1954 | Rafferty | 285/85 |
| 4,643,459 | A | * | 2/1987 | Carson | 285/84 |
| 5,184,851 | A | * | 2/1993 | Sparling et al. | 285/79 |
| 5,333,915 | A | * | 8/1994 | Sparling et al. | 285/78 |
| 6,106,026 | A | * | 8/2000 | Smith, III | 285/85 |

FOREIGN PATENT DOCUMENTS

DE 2742567 A1 3/1979

OTHER PUBLICATIONS

Swedish Standard SMS 1151, dated Nov. 1, 1969 relating to hose couplings.
Illustration from AWG-Katalog, No. 213, p. 171, issued for the fire brigade fair "Interschutz—Der Rote Hahn" in Hanover, Germany, mid-1988.

* cited by examiner

*Primary Examiner*—David E Bochna
(74) *Attorney, Agent, or Firm*—Carlson, Gaskey & Olds PC (57) ABSTRACT

A hose coupling includes two coupling halves which take a coupling end position by relative rotation against each other about a coupling path of no more than 180°. The hose coupling further includes a locking mechanism that prevents an unintended opening of the coupling. The locking mechanism comprises a latching mechanism, in particular a latching pin mechanism. The latching mechanism is automatically activated in the coupling end position and prevents a relative rotation of the coupling halves against each other. The latching mechanism is preferably configured such that, already before reaching the coupling end position, the latching mechanism is activated so far that it counteracts a relative rotation of the coupling halves in an opening direction.

11 Claims, 7 Drawing Sheets

HOSE COUPLING WITH A LOCKING MECHANISM

RELATED APPLICATIONS

The application claims priority to German Application No. 20 2005 008 795.5, which was filed on Jun. 6, 2005.

BACKGROUND OF THE INVENTION

The invention relates to a hose coupling, in particular to a hose coupling including two coupling halves which take a coupling end position by relative rotation against each other about a coupling path of no more than 180°.

Known "Storz" couplings, which are used in particular in the field of firefighting, belong to an axially closing coupling type. Two identical coupling halves, which each consist of a hose connection and a cam ring rotatably arranged on the hose connection, are characteristic of Storz couplings. In this coupling type, at best only one half can alternatively be configured in one piece in the form of a stationary coupling.

The cam rings of the symmetrical coupling halves can be rotated with respect to the hose connections associated to each half, whereby it is possible to bring the cams of the cam rings into engagement in a bayonet lock manner with pitched shoulders of the cam ring of the respective other coupling half. The rotation of the cam rings produces an axial approach of the hose connections so that sealing rings arranged in the end faces thereof are pressed axially against each other without any mutual rotation. The angle of rotation necessary until the coupling end position is reached is principally determined by the number of cam/shoulder pairs, but is less than 180° in any case.

In a stationary coupling which is compatible with the hose coupling, the sealing ring, apart from the force transmitting elements, i.e. the cams and the shoulders, is also anchored on the one-piece coupling half and ensures, along with a rotatable cam ring of the counter-coupling half, the operational principle. A variant of the hose coupling is a cap fire hose coupling functioning as a pipe closure. In this case the hose connection is replaced by a blind cap formed in an identical manner on the coupling side and having a closed bottom.

Storz couplings are now used in many industrial fields where the transport of media other than water requires a protection against an unintended opening of the coupling connection. Since this coupling type belongs to the quick couplings, it is advantageous to have an automatic locking mechanism that can operate without additional manipulations during connection, and which cannot be forgotten, contrary to screw elements or wire brackets, for example. This is realized hitherto primarily in that a coupling collar behind a coupling shoulder obtains a milling groove through which a locking pawl movable about a rotation axis projects into a coupling path, whereby a decoupling is blocked. In most cases during the coupling operation, a cam of the counter-coupling half engages on an oblique plane of the pawl so that the pawl automatically gets out of the way, which in the opposite direction is prevented by a radial face. The weakening of the force transmitting region due to the milling groove can be accepted without concern, in particular when forged aluminum is used as coupling material, because it has great strength.

In the last years, the use of large-volume hoses having hose diameters of eight, ten and even twelve inches—at nominal pressures of 16 and more—has rendered corresponding coupling sizes necessary. Even if the pumping medium is water in most cases, the handling, which is not simple anymore, and the increased potential of danger of large masses under pressure in movable pipes require the arrangement of a locking mechanism. On the one hand, considering the tools and the number of pieces, the use of forging technology is too expensive. This is the reason why the couplings are produced in a casting process whereby in turn, the reduction in strength mentioned with respect to the configuration of the locking mechanism cannot be accepted in a hitherto used version. On the other hand, a large part of the periphery is not visible with such coupling sizes. For this reason, and also due to a plurality of ribs, the coupling state cannot be easily and immediately recognized, and misjudgements of supposed coupled connections cannot be excluded in spite of possible indicators. Here, a locking effect already starting during the coupling operation can prevent potential dangers.

It is an object of the invention to provide a hose coupling with a locking mechanism which, despite the transmission of large forces generally at high pressures, is not substantially reduced in cross-section by additional elements, which is simple to handle, and the effect of which occurs automatically and early during the coupling operation.

SUMMARY OF THE INVENTION

According to the invention, a hose coupling includes two coupling halves which take a coupling end position by relative rotation against each other about a coupling path of no more than 180°. The hose coupling further comprises a locking mechanism that prevents an unintended opening of the coupling. The locking mechanism comprises a latching mechanism, particularly a latching pin mechanism. The latching mechanism is automatically activated in the coupling end position and prevents a relative rotation of the coupling halves against each other. The invention is based on the idea that, contrary to locking pawl mechanisms used hitherto, latching mechanisms can also be realized in large couplings which are produced in a casting process without any weakening of the force transmitting region. The automatically acting latching mechanism offers an efficient protection against rotation for the coupling halves and generally has the advantage that no additional manipulations are necessary for activating the locking mechanism.

According to the preferred embodiment of the invention, each coupling half comprises at least one spring-loaded latching pin which, in the coupling end position, latches into place in a latching hole of the respective other coupling half. The latching pin is preferably mounted in a cam piece and projects beyond an end face facing the respective other coupling half.

According to a particularly advantageous development of the invention, the latching mechanism is configured such that, already before reaching the coupling end position, the latching mechanism is activated so far that it counteracts a relative rotation of the coupling halves in an opening direction. This concept can be realized in that the spring-loaded latching pins of both coupling halves slide on the end faces during the rotary movement and run over one or more additional latching points which are formed as latching holes. It is advantageous that any additional latching point does not offer any substantial resistance to the rotary movement in a closing direction but reliably blocks the rotary movement in an opening direction. In this way, a protection against rotation in the opening direction is obtained which starts early during the coupling operation.

These and other features of the present invention can be best understood from the following specification and drawings, the following of which is a brief description.

DETAILED DESCRIPTION OF THE PREFERRED EMBODIMENT

The Figures show a coupling half of a Storz coupling modified according to the invention and having three cam/shoulder pairs. Since Storz couplings are generally known to a person skilled in the art, only the specific features according to the invention are described in detail in the following description.

Figure 1:
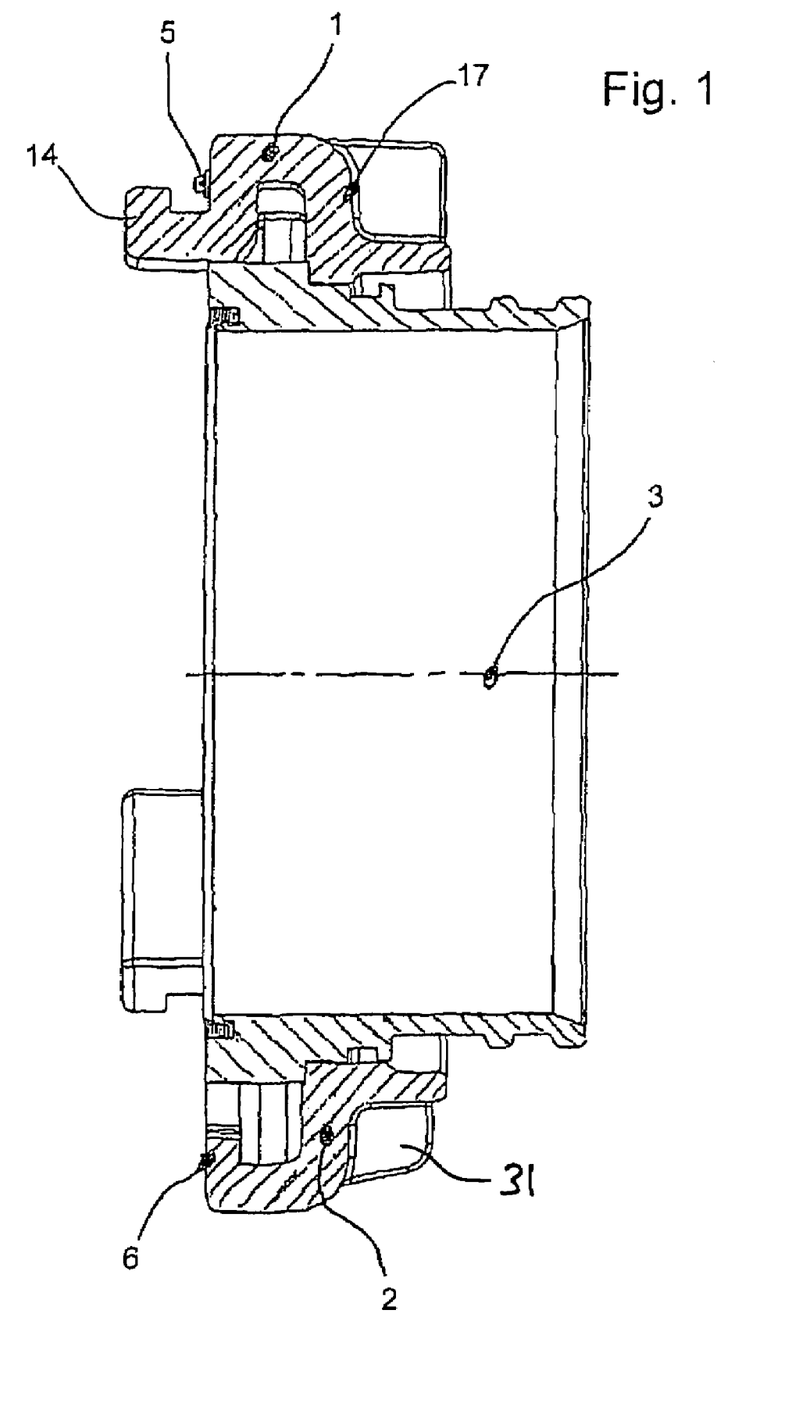
FIG. 1 shows a radial sectional view through a coupling half of a hose coupling according to the invention.
Figure 2:
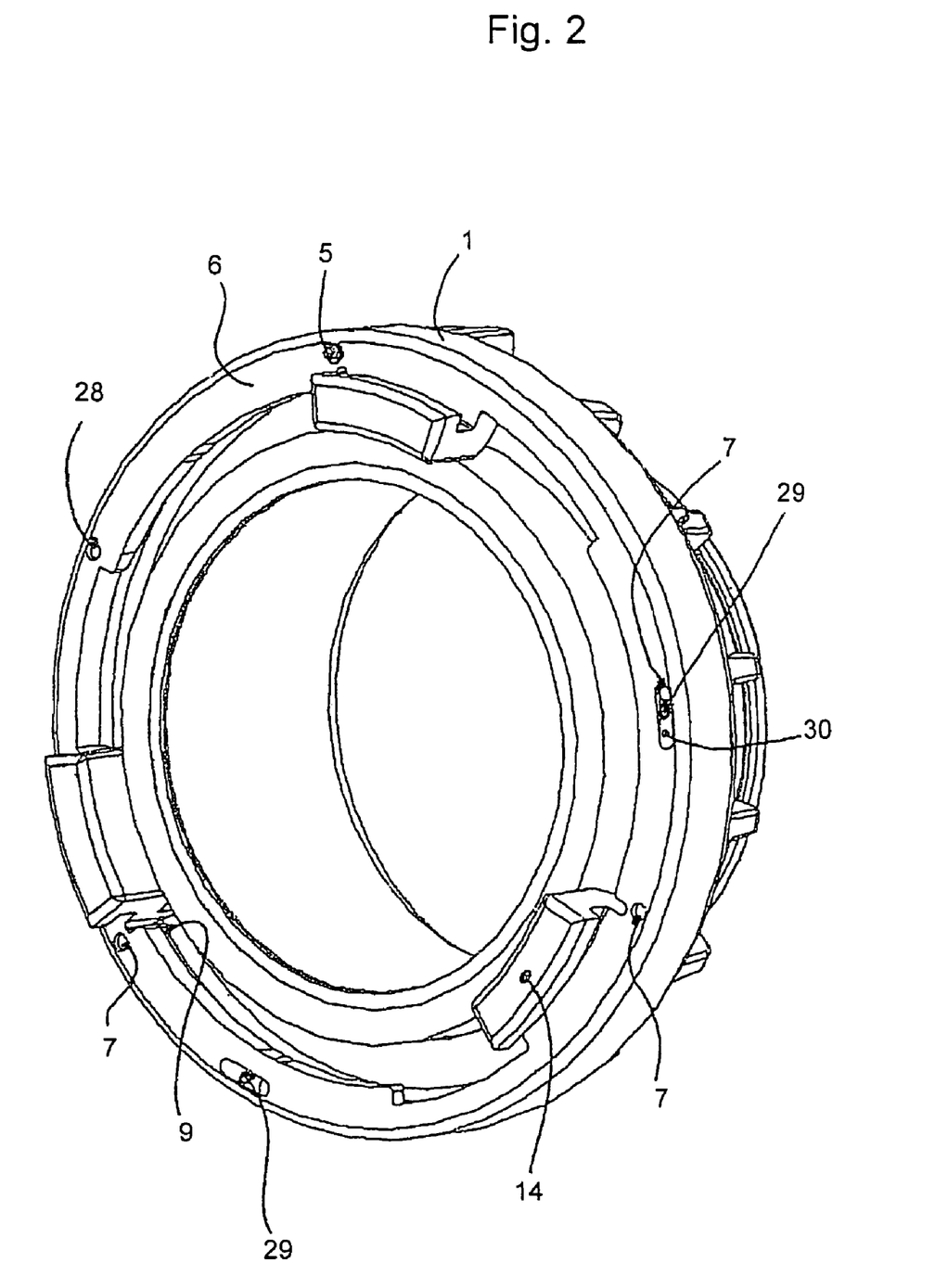
FIG. 2 shows a perspective oblique view of the coupling half.
Figure 3:
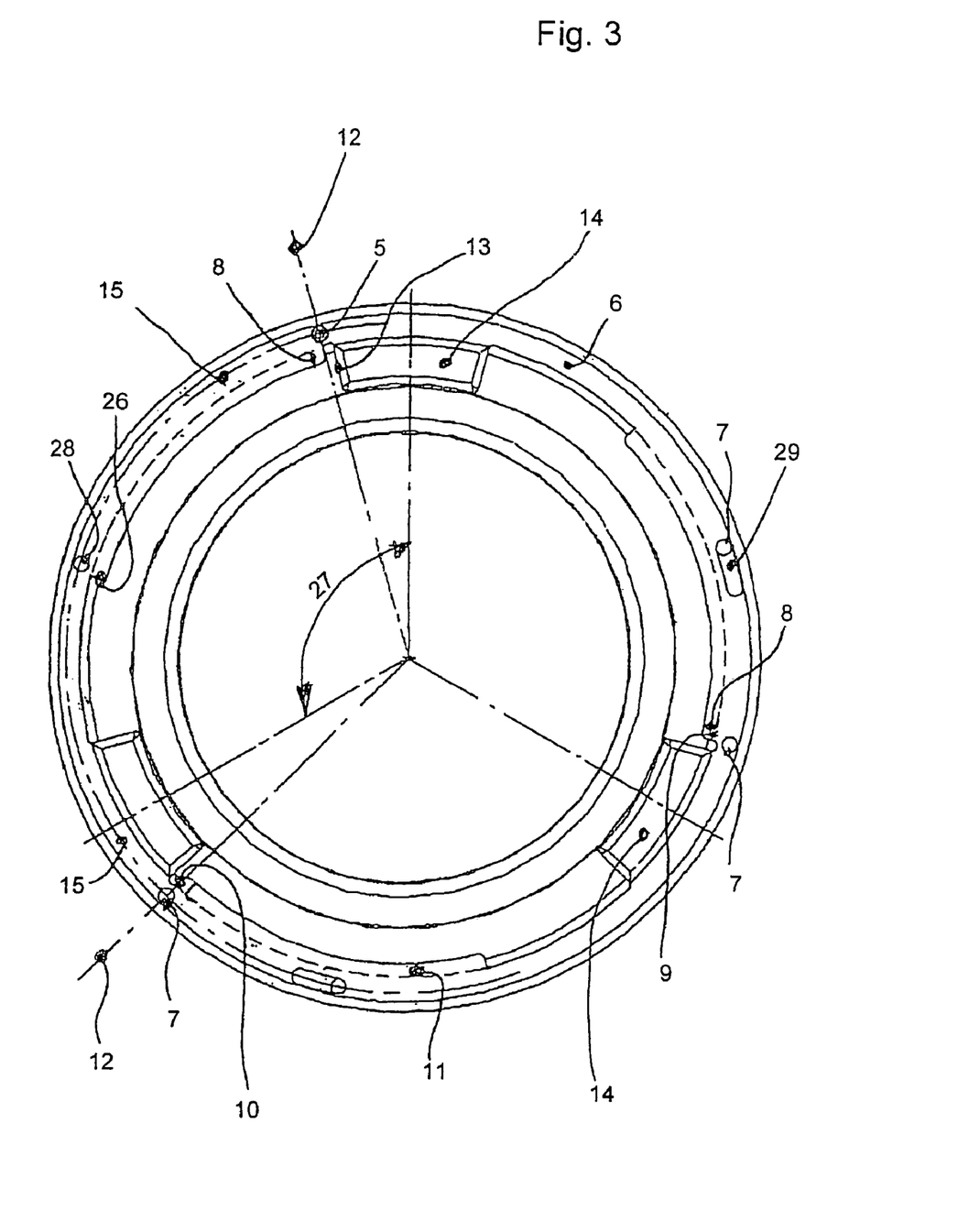
FIG. 3 shows a front view of the coupling half.
Figure 4:
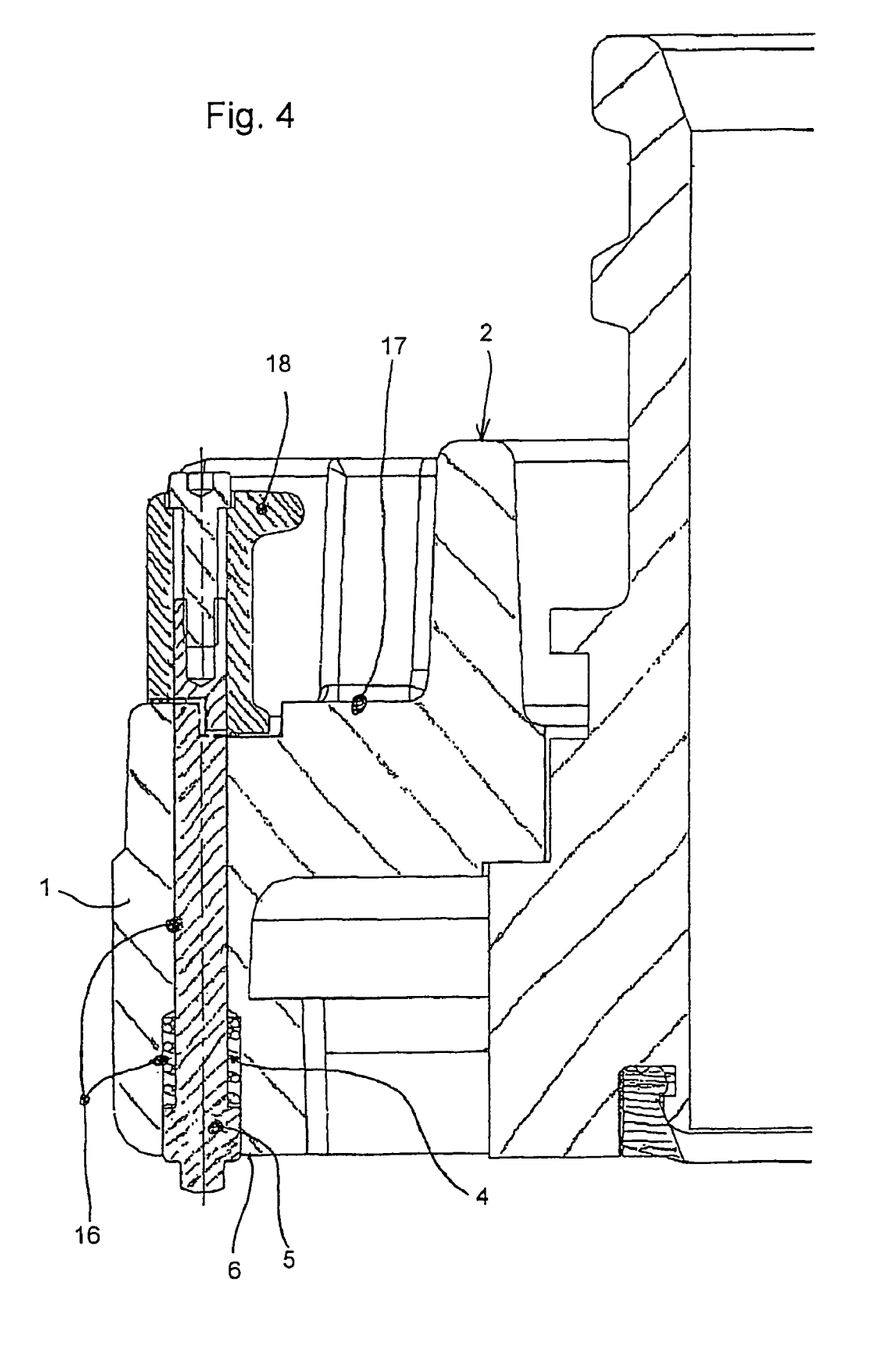
FIG. 4 shows a radial partial section through the locking mechanism in the position "locking."
Figure 5:
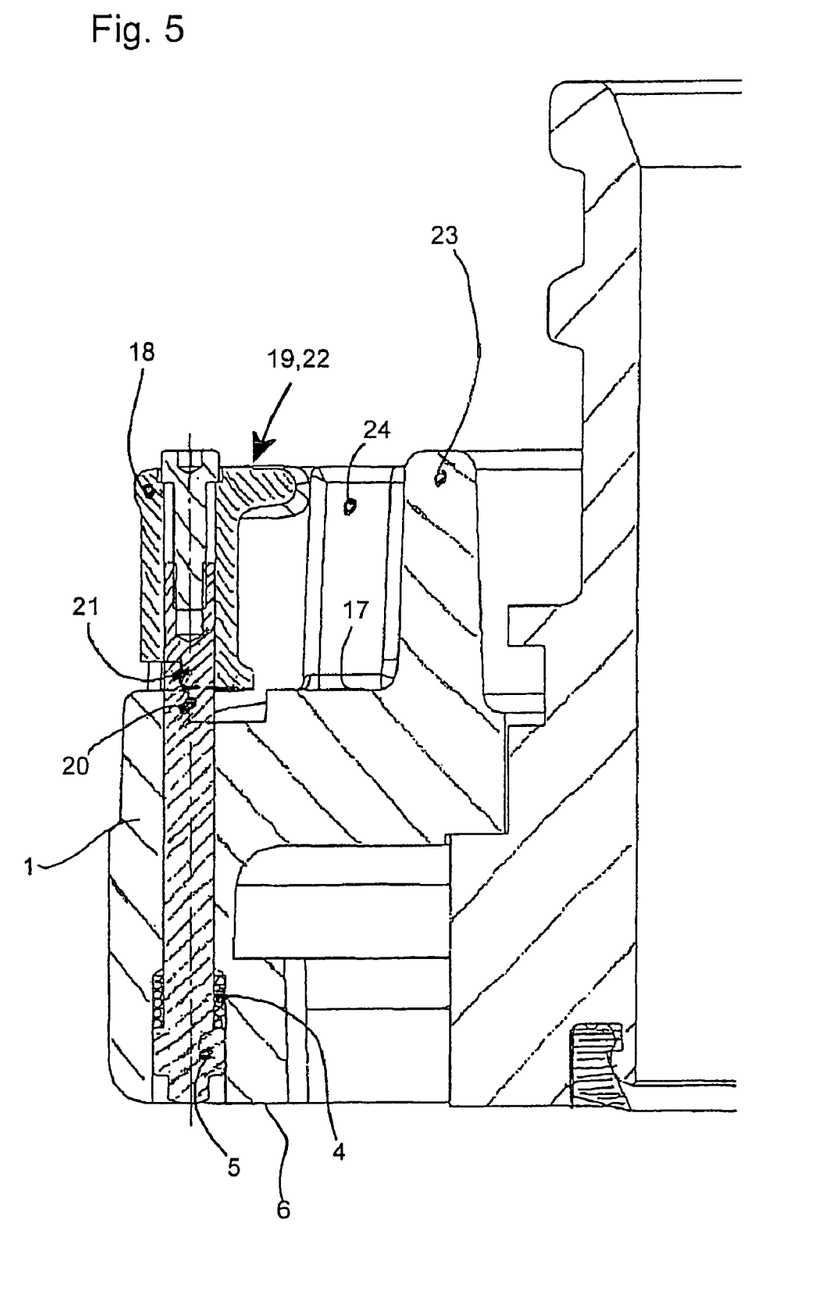
FIG. 5 shows a radial partial section through the locking mechanism in the position "locking released."
Figure 6:
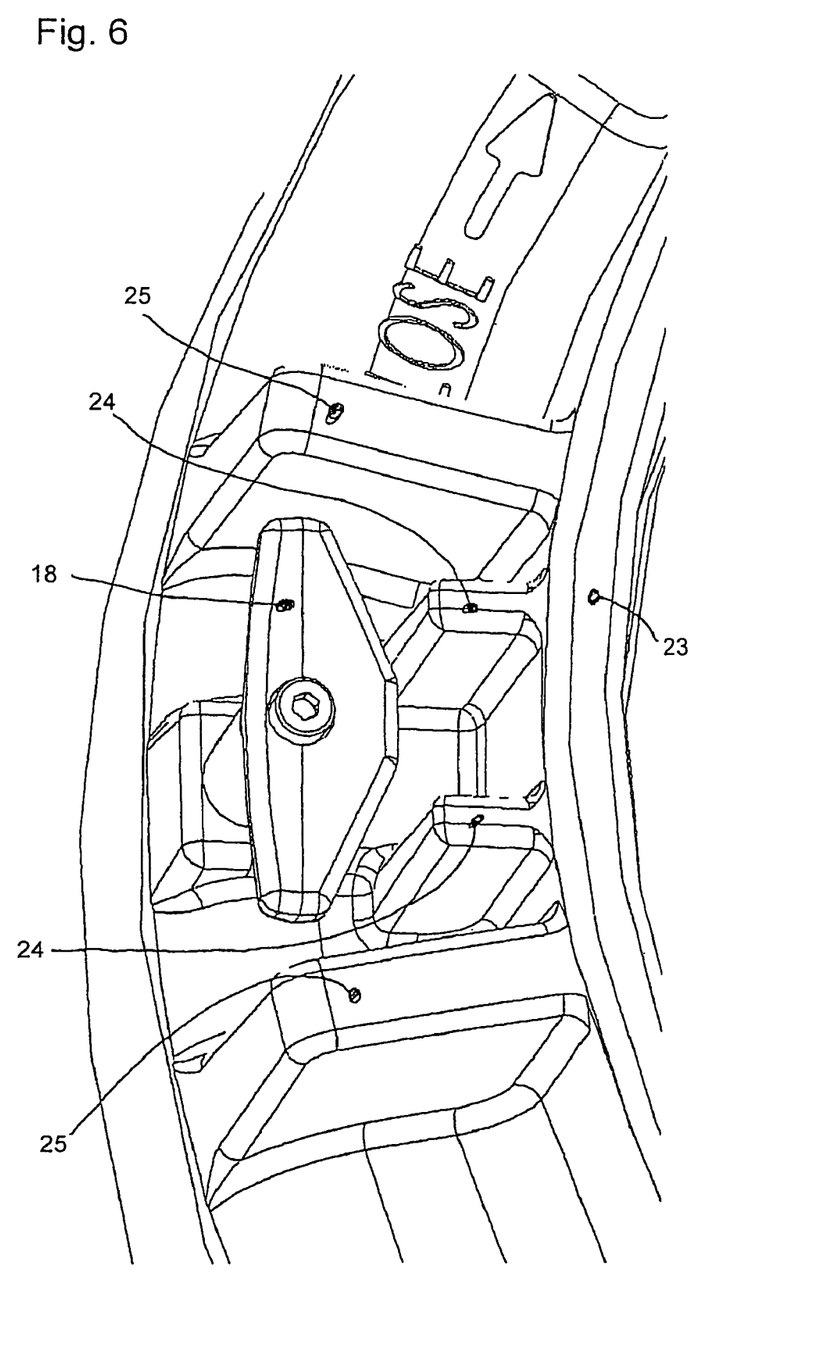
FIG. 6 shows a rear view of the locking mechanism in the position "locking."
Figure 7:
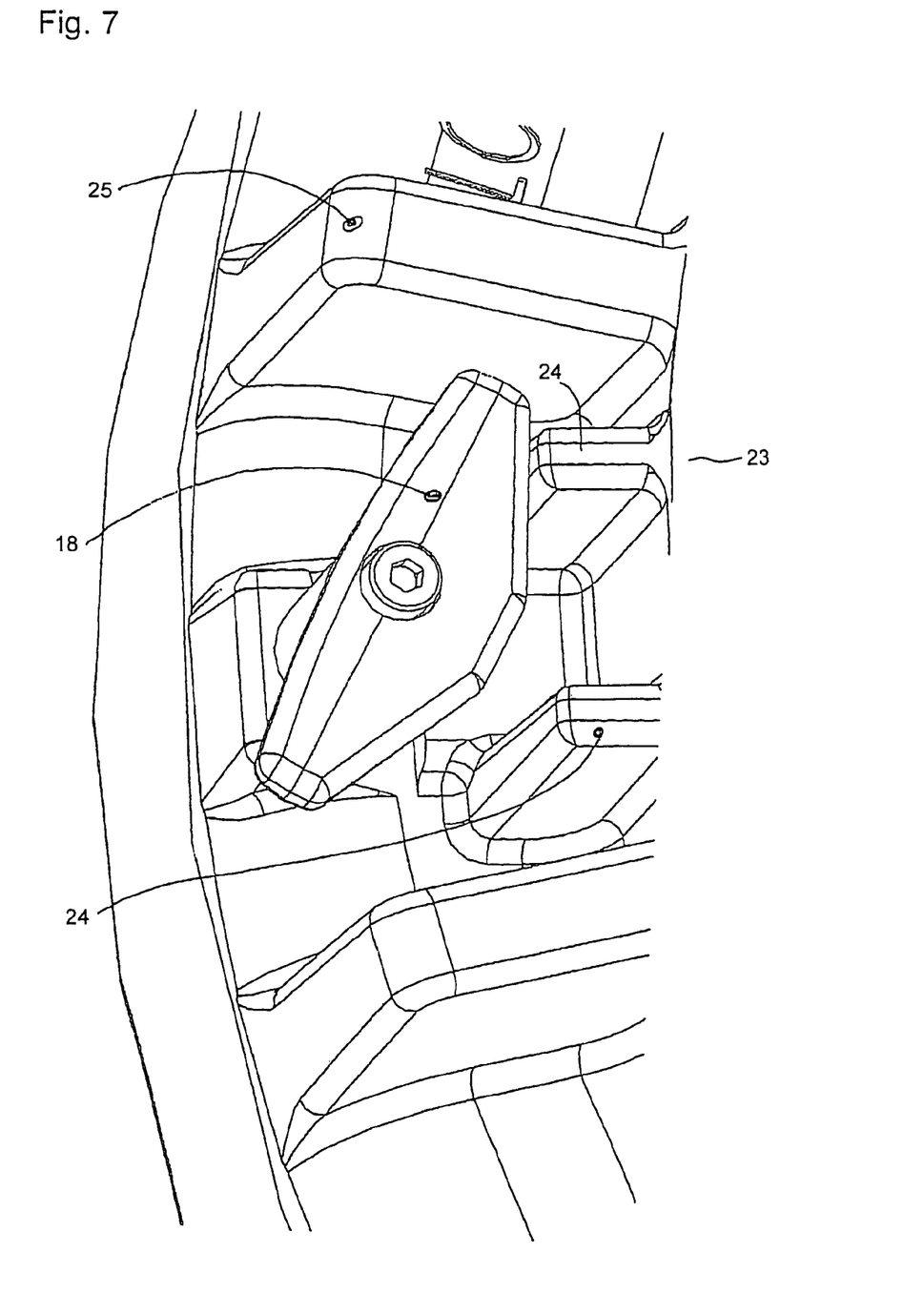
FIG. 7 a rear view of the locking mechanism in the position "unlocked."

On a collar 1 of a cam piece 2, a latching pin 5 which is mounted in parallel to a flow axis 3, and which is biased by a pressure spring 4, projects a few millimeters beyond an end face 6 facing a counter-coupling half. The latching pin 5 latches, in a coupling end position, into place in a latching hole 7 configured as a blind hole on the counter-coupling half after having run over additional latching points 29. The coupling end position as limitation of the coupling path is realized by a radial face 8 on a stop 9 at an end portion 10 of a coupling shoulder 11.

The position of the latching pins 5 and of the latching holes 7 is chosen such that they lie one on top of the other in the coupling end position, and that is why they are positioned on the same diameter 15. As to the position in a peripheral direction, a position is particularly advantageous which is determined by virtual radial lines 12 on the cam pieces 2 of both coupling halves which correspond to the bisecting lines between the radial faces 8 and adjacent lateral limitations 13 of cams 14 (cf. FIG. 3). In the coupling end position, these radial lines 12 lie one on top of the other and belong to a coupling region which is passive with respect to the force transmission. But due to the stop 9, along with the resulting larger thickness of the shoulder 11, this region has a greater strength and is for this reason also suitable for a stepped hole 16 having a diameter of less than ten millimeters for receiving the latching pin 5 and a pressure spring 4. However, it is basically also possible to arrange the elements of the latching pin mechanism on the bisecting line of the radial lines 12, since in this case, too, the latching pin 5 and the pressure spring 4 would take a position in which they lie one on top of the other.

Since cam pieces for Storz couplings comprise at least two, and in larger couplings three or more cam/shoulder pairs, the bisecting lines mentioned before are present as coupling radial lines 12 two or three times per coupling half. For the mandatory one latching pin 5, accordingly one or two latching holes 7 can be provided, since the two latching pins 5 of the coupling half must not hit each other. This can however be prevented without any problem in the case of at least one rotatable cam piece 2 per coupling connection.

By fitting the coupling halves into each other, the latching pins 5 of both coupling halves are pushed back by the respective counter-end face 6 against the force of the pressure spring 4. During the rotary movement, the latching pins 5 further slide on these counter-end faces 6 and move towards that latching hole 7 into which they latch into place when they reach the coupling end position, by running over one or more additional latching points 29, which are formed as latching holes 7. The latching pins 5 follow a path 30 obliquely ascending in the direction of the end portion 10 of the shoulder 11, the number of latching points 29 being selectable depending on the security stage. For the decoupling process it is necessary to manually move the latching pins 5, that are connected to unlocking elements 18 on a rear side 17 of the collar, out of the latching holes 7 against the spring force. In this axially shifted position 19, the unlocking element 18 can be fixed in a less stable position 22 by rotation of approximately 30°. This ensures that the operating person has a free hand necessary for the decoupling operation. The unlocking element is adapted to a step 20 on the rear side 17 of the collar also by a step 21. The rotary movement of the unlocking element 18 is deliberately limited by a coupling neck 23 or by stopping ribs 24 connected thereto in order to prevent a stable inoperative condition of the locking mechanism.

Contrary to ribs 31, which are disposed over an entire periphery, have a stabilizing effect, and serve for handling during the rotary movements of coupling; the adjacent ribs 25, which are expanded up to an outside periphery of the collar 1 and almost up to the length of the coupling neck 23, offer a certain protection function against damages of the unlocking element 18, thus providing security in general during the handling of the coupling.

On a start portion 26 of the shoulder of a coupling segment 27 which contains the latching pin 5 at the end portion 10 of the shoulder 11, a blocking hole 28 having the same configuration as the latching holes 7 makes sure that the rotary movement for coupling cannot be executed when hitting the latching pin 5 of the counter-coupling half, because here, the latching pins 5 of both coupling halves would collide in the coupling end position, and thus no locking effect could be produced.

The described enhanced locking mechanism thus essentially comprises in arranging, on the coupling path, additional latching points 29 in the form of latching holes 7 with a path 30 obliquely ascending towards the end portion 10 of the shoulder. The additional latching points do not offer any noticeable resistance during coupling but, in turn, provide blocking during an unwanted decoupling. This has significant advantage that—as happens in the existing versions—at least one further security stage is provided to prevent dangers or damages when the coupling end position is not yet reached and thus the locking element does not latch into place.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A hose coupling including;
   two coupling halves which take a coupling end position by relative rotation against each other about a coupling path of no more than 180°, and wherein the two coupling halves comprise cam pieces which are substantially of a common structure and have cams which can be brought into engagement in a bayonet lock manner with pitched shoulders of a respective other coupling half to limit the coupling path, and each coupling half comprises a spring-loaded latching pin, a latching hole corresponding to the coupling end position, and at least one additional latching hole; and a locking mechanism operating against an unintended opening of the hose coupling, the locking mechanism comprising a latching mechanism that is automatically activated in the coupling end position and prevents a relative rotation of the coupling halves against each other, and wherein the latching mechanism comprises a latching pin mechanism that is configured such that the latching pin can engage either in the latching hole in the coupling end position, or the additional latching hole in a position different from the coupling end position, thus blocking a decoupling movement of the coupling halves.

2. The hose coupling according to claim 1, wherein the spring-loaded latching pin is mounted near the cam piece and projects beyond an end face facing the respective other coupling half.

3. The hose coupling according to claim 1, wherein the coupling path is limited by a radial face on a stop at an end of a shoulder, and the spring-loaded latching pin and the latching hole are each arranged on a different virtual radial line which corresponds to a bisecting line between the radial face and an opposing lateral limitation of an adjacent cam.

4. The hose coupling according to claim 3, wherein the two coupling halves are divided into virtual coupling segments, with the spring-loaded latching pin being provided in one of the virtual coupling segments at an end portion of one of the shoulders, the latching mechanism further comprising a blocking hole in which the spring-loaded latching pin can latch into place, thereby preventing a rotary movement into the coupling end position, the blocking hole being provided at a start portion of the shoulder.

5. The hose coupling according to claim 1, wherein the spring-loaded latching pin is connected to an unlocking element which is accessible in the coupling end position.

6. The hose coupling according to claim 5, wherein the unlocking element is protected by ribs.

7. A hose coupling including:
two coupling halves which take a coupling end position by relative rotation against each other about a coupling path of no more than 180°, and wherein the two coupling halves comprise cam pieces which are substantially of a common structure and have cams which can be brought into engagement in a bayonet lock manner with pitched shoulders of a respective other coupling half to limit the coupling path, and wherein each coupling half comprises at least one spring-loaded latching pin which, in the coupling end position, latches into place in a latching hole of the respective other coupling half, and wherein the spring-loaded latching pin is connected to an unlocking element which is accessible in the coupling end position wherein by axial pulling of the unlocking element, the spring-loaded latching pin can be brought out of engagement with the latching hole into an axially shifted position, the unlocking element being fixable in the axially shifted position; and a locking mechanism operating against an unintended opening of the hose coupling, the locking mechanism comprising a latching mechanism that is automatically activated in the coupling end position and prevents a relative rotation of the coupling halves against each other, the latching mechanism comprising a latching pin mechanism.

8. The hose coupling according to claim 7, wherein the unlocking element is fixable in the axially shifted position by rotation about an axis defined by the unlocking element, the rotary movement of the unlocking element being limited by one of a coupling neck and a stopping rib.

9. A hose coupling including;
two coupling halves which take a coupling end position by relative rotation against each other about a coupling path of no more than 180°;

a locking mechanism operating against an unintended opening of the hose coupling, the locking mechanism comprising a latching mechanism that is automatically activated in the coupling end position and prevents a relative rotation of the coupling halves against each other, and wherein the latching mechanism, prior to reaching the coupling end position, is already activated so far that the latching mechanism counteracts a rotation of the two coupling halves in an opening direction, and wherein the latching mechanism comprises a latching pin mechanism; and wherein the two coupling halves comprise cam pieces which are substantially of a common structure and have cams which can be brought into engagement in a bayonet lock manner with pitched shoulders of a respective other coupling half to limit the coupling path, each coupling half comprising at least one spring-loaded latching pin which, in the coupling end position, latches into place in a latching hole of the respective other coupling half, the spring-loaded latching pins being mounted in the cam pieces and projecting beyond an end face of the respective other coupling half, the spring-loaded latching pins of both coupling halves sliding on the end faces during the rotary movement and run over at least one additional latching point which is formed as latching holes.

10. The hose coupling according to claim 9, wherein each spring-loaded latching pin during the rotary movement moves on an obliquely ascending path towards a latching hole in which the spring-loaded latching pin latches into place when the coupling end position is reached.

11. A hose coupling including:
two coupling halves which take a coupling end position by relative rotation against each other about a coupling path of no more than 180°; and a locking mechanism operating against an unintended opening of the hose coupling, the locking mechanism comprising a latching mechanism that is automatically activated in the coupling end position and prevents a relative rotation of the coupling halves against each other, and wherein the latching mechanism, prior to reaching the coupling end position, is already activated so far that the latching mechanism counteracts a rotation of the two coupling halves in an opening direction, and including at least one additional latching point provided on the coupling path, and wherein the at least one additional latching point does not provide any substantial resistance to the rotary movement in a closing direction but reliably blocks the rotary movement in the opening direction.

* * * * *